United States Patent [19]

Glemet et al.

[11] Patent Number: 5,084,222
[45] Date of Patent: Jan. 28, 1992

[54] PULTRUSION PROCESS

[75] Inventors: Michel Glemet, Serquigny; Alain Causier, Bernay; Bernard Gourdon, Dardez Evreux, all of France

[73] Assignee: Atochem, Puteaux, France

[21] Appl. No.: 371,690

[22] Filed: Jun. 20, 1989

Related U.S. Application Data

[63] Continuation of Ser. No. 147,706, Jan. 25, 1988, abandoned.

[30] Foreign Application Priority Data

Feb. 13, 1987 [FR] France .................. 87 02084

[51] Int. Cl.$^5$ ............................................. B29C 43/22
[52] U.S. Cl. .................................. 264/136; 264/171; 264/257; 264/294; 156/180
[58] Field of Search ............... 156/180; 264/134, 136, 264/241, 137, 135, 257, 258, 294, 171

[56] References Cited

U.S. PATENT DOCUMENTS

| | | | |
|---|---|---|---|
| 3,529,050 | 9/1970 | Smith | 264/137 |
| 4,154,634 | 5/1979 | Shobert | 264/258 |
| 4,168,194 | 9/1979 | Stiles | 264/137 |
| 4,252,696 | 2/1981 | McQuarrie | 264/137 |
| 4,296,060 | 10/1981 | Killmeyer | 264/137 |
| 4,394,338 | 7/1983 | Fuwa | 264/135 |
| 4,445,957 | 5/1984 | Harvey | 156/180 |
| 4,588,538 | 5/1986 | Chung | 264/136 |

Primary Examiner—Jay H. Woo
Assistant Examiner—Jeremiah F. Durkin, II

[57] ABSTRACT

In the process for manufacturing thermoplastic polymer articles reinforced with long continuous fibers by pultrusion, including impregnating tufts of fibers with thermoplastic resin, circulating an assemblage of said impregnated tufts in a heat assembly so as to melt the resin, and then hot shaping the article in an appropriate die to give it essentially its final shape before passing it through a second cooling die, the improvement including compressing the assemblage of impregnated tufts in the heated assembly consisting essentially of a flat die having an inlet zone and an exit zone, the inlet being wide enough to allow the initial volume of the impregnated tufts to pass through and a horizontal gap adapted to be varied in thickness, and allowing the emerging assembly of impregnated tufts to be brought to the shape of a sheet of minmimium thickness before shaping, and the flat die and rigid polyvinyl chloride article prepared by the process.

4 Claims, 1 Drawing Sheet

PULTRUSION PROCESS

This application is a continuation of application Ser. No. 147,706, filed Jan. 25, 1988, now abandoned.

BACKGROUND OF THE INVENTION

The present invention pertains to a process for manufacturing thermoplastic polymer shaped articles reinforced with long continuous fibers by pultrusion. Prior to the shaping of rovings impregnated with thermoplastic resin, the process comprises compressing the said rovings so as to form a sheet in which the elementary fibers of the rovings are impregnated with thermoplastic resin in the molten state. The sheet is formed by passing the rovings, after impregnation with thermoplastic resin, into a heated rectangular flat die to compress them, thus forcing the molten resin to penetrate between the fibers. The process is applicable to thermoplastic polymers in general, but also makes it possible to obtain a new article made of polyvinyl chloride reinforced with long continuous fibers.

In a general manner, the process of manufacturing thermoplastic resin profiles by pultrusion is known. The usual process consists of impregnating the rovings with resin, then passing the bulk substance into a heated tunnel, for example, using hot air or infrared radiation, at a temperature sufficient to melt the polymer. At the tunnel exit, the rovings coated with resin enter a heated device which gives the final shape to the product being produced, which is cooled as it emerges from the device. This process has one serious disadvantage: the difficulty of melting and homogeneously distributing the thermoplastic resin within the rovings.

A roving is formed from the combination of several continuous elementary fibers. In the pultrusion process, several rovings are impregnated and then pass into the heated tunnel where they combine in bulk with one another to form large-volume bundles or groups of fibers. Radiation heating has difficulty in producing melting of the thermoplastic resin at the core of the bundle and its impregnation of the elementary fibers. This lack of impregnation homogeneity and consequently the entrapment of air between the unimpregnated fibers can be the source of defects in the mechanical properties of the final product. These effects become more significant, the greater the number of rovings and the larger the final shape.

In addition, such a process does not make it possible to produce a rigid polyvinyl chloride shaped article reinforced with long continuous fibers, because of the properties of polyvinyl chloride. Under the conditions of the process, gelling of the polyvinyl chloride, especially in the case where it is free of plasticizer, is impossible to produce by simply raising the temperature without the danger of thermal degradation. At present, gelling is performed in kneading devices which create shearing of the material, essential to gelling. Under the condition of the known processing, the highly incomplete gelling of the matrix results in defective coating of the reinforcement fibers, leading to mediocre-quality shapes or even to fiber breakage when the shape is being drawn.

SUMMARY OF THE INVENTION

The process according to the invention makes it possible, using the pultrusion technique, to shape rovings in which the elementary fibers are practically all impregnated with thermoplastic resin after maximum elimination of the air trapped between the fibers.

The process comprises impregnating rovings; i.e., continuous tufts of fibers, with thermoplastic resin using known methods, passing the combination through a heated assembly so as to melt the thermoplastic resin, then hot-forming the article in an appropriate die to essentially give the article its final shape before passing it through a second cooled die. The characteristic of the process is to compress the bundles of rovings; i.e., the group of tufts impregnated with thermoplastic resin, in the heat assembly consisting of a flat die whose flared inlet is sufficiently wide to allow the initial volume of the bundles of rovings to pass through with a variable thickness gap in the die making it possible to reduce the impregnated combination to the form of a sheet of minimum thickness before shaping.

DETAILED DESCRIPTION

Figure 1:
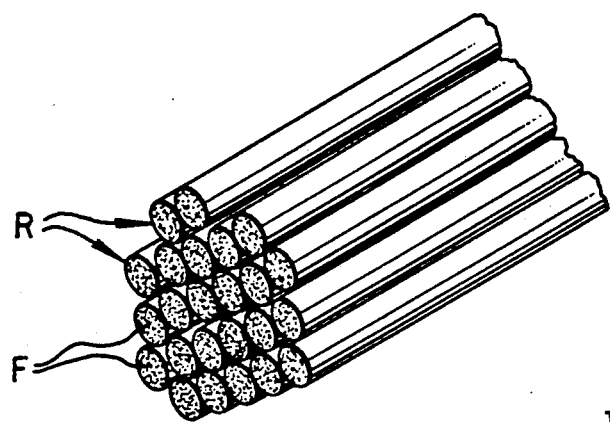
FIG. 1 is a perspective view of a bundle of rovings used in the process of the present invention.

The invention will be further described in connection with the drawings. The attached figures show details of the characteristics of the process. FIG. 1 illustrates a bundle of rovings R, which rovings each, in turn, consist of several fibers F. These rovings are, according to the invention, impregnated with thermoplastic resin before being combined into bundles.

Figure 2:
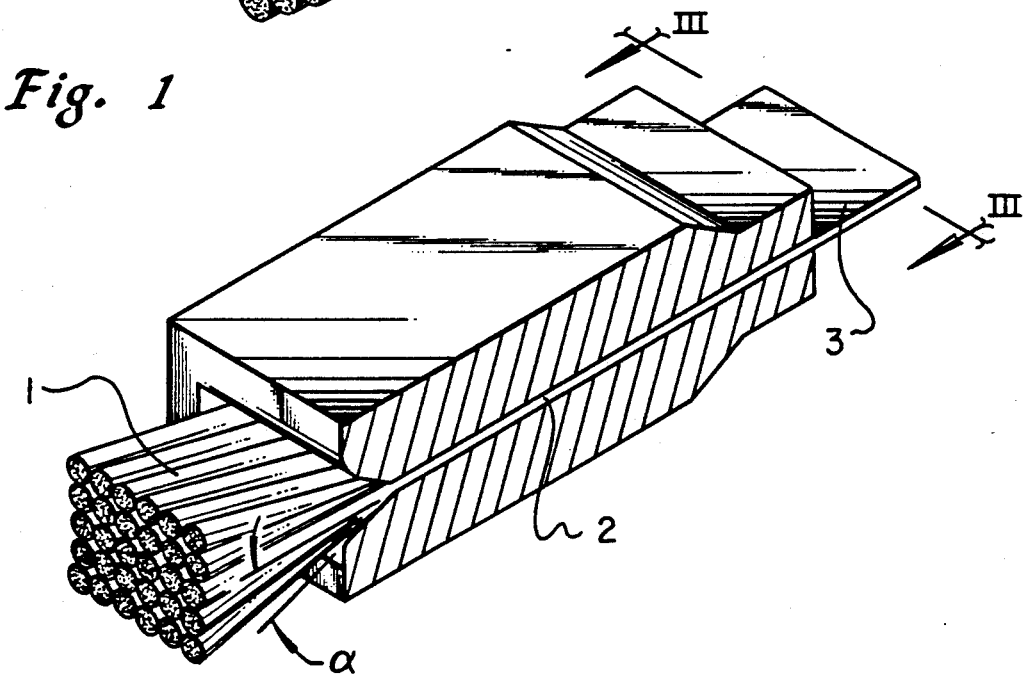
FIG. 2 is a perspective view, partially in section showing a bundle of rovings being shaped by a die into a sheet.
Figure 3:
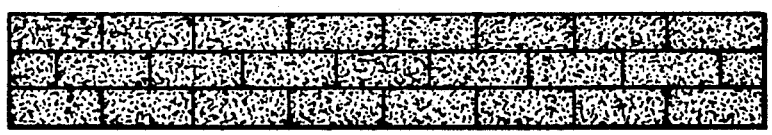
FIG. 3 is a section view taken along line III—III of FIG. 2.

The bundles are inserted into the die in FIG. 2 through the flared inlet 1 and drawn and compressed in the variable thickness gap 2. As it emerges from the die, the sheet 3 consisting of fibers impregnated with molten thermoplastic resin is directed toward a conventional above-mentioned shaper (not shown). As shown in FIG. 3, the sheet emerging from the flat die, in which the gap is of essentially rectangular cross section, is in the form of compressed rovings, tightly bonded to one another, the elementary fibers of which are impregnated with thermoplastic resin. The uniform impregnation is the consequence of compression, which makes it possible both to increase the heat exchange surface and to eliminate as much air as possible trapped within and between the rovings. The gap, with an essentially rectangular cross section, has the approximate geometry of a rectangular parallelepiped in the outlet zone.

The intersection angle alpha, shown in FIG. 2, corresponding to the slope of the inlet zone between the outside and the horizontal portion of the die gap, ensures progressive melting of the surface polymer which then acts as a lubricant.

The length of the inlet zone and the value of the intersection angle can vary depending on the polymers in question and the volume of pre-impregnated rovings being inserted. A length between 35 and 50 mm and an angle between 1° and 20° depending on the particulars described seem particularly well suited.

The length of the die must be such that, depending on its temperature, which is less than the thermal breakdown temperature of the thermoplastic polymer, the latter is molten at the core of the sheet as it emerges from the said die.

The thickness of the die gap can be adjusted to allow the production of sheets of various thicknesses, leading to profiles of greater or lesser volume. This thickness adjustment can be made by any conventional means capable of affecting the spacing of the gap, for example, screw or spring systems by which the opposite side of the die can be moved apart or together.

According to the invention, rovings are impregnated using known techniques, for example, by unwinding the rovings in a fluidized bed of thermoplastic polymer in the form of a fine powder. It is also possible to coat the rovings by extruding them through a crosshead die by means of which they can be coated with a layer of polymer and it is also possible to coat the rovings with polymer latex. The rovings, as already mentioned, occur in the form of continuous tufts consisting of a combination of several elementary fibers. These rovings can be formed from mineral or organic fibers, with glass, carbon, and aramid fibers being those most commonly used for reinforcement of plastic materials. The impregnated rovings, combined into bundles, are introduced into the die already described, which is heated so as to melt the polymer. The sheet emerging from the die, kept at a temperature so that the polymer remains in the molten state, is conveyed to a conventional shaping die which gives the sheet the shape of the final article being produced.

This second die is, of course, at a temperature high enough to keep the polymer sufficiently fluid for shaping. It is not out of the question, especially for the case of production of complex or high-volume shapes, to subject the sheet to a progressive preshaping operation before final shaping. As it emerges from the shaping die, the profile passes through a cooled shaper whose inlet geometry is essentially identical to the outlet geometry of the shaping die. The shape is then taken to a drawing bench where it is cut to the desired dimensions.

The process according to the invention is especially suitable for pultrusion of solid or hollow articles of various shapes based on thermoplastic resins reinforced with continuous long fibers. Particularly recommended thermoplastic resins may be selected from the polyolefins: high- and low-density and low-density-linear polyethylenes or polypropylene; ethylene-vinyl acetate copolymer; polystyrene, acrylonitrile-butadiene-styrene copolymers (ABS), polyvinyl chloride, 6, 11, 12, 6-6 and 6-10 polyamides, polyesters, poly(ether amide) sequenced copolymer, fluorinated polymers, polysulfone, polyethersulfone, polycarbonate, heat-stable thermoplastic polymers such as polyetheretherketone, polyphenylene sulfur, polyetherimide, polyphenylene oxide, polyphenylene ether or mixtures thereof and functional thermoplastic oligomers which react by polyaddition or polycondensation, possibly with a coreagent.

Another advantage of the process is the production of a new species of product: a consequent-section shape of rigid polyvinyl chloride reinforced with continuous long fibers, more particularly with long glass fibers. Thin polyvinyl chloride profiles reinforced with long fibers are known, but for the reasons cited above, having to do with the characteristics of polyvinyl chloride, it has never been possible to produce consequent-section shapes in which the length of the reinforcement fibers continuously corresponds to the article length.

Shapes obtained according to the invention present the characteristic of having very high rigidity. In addition, it is possible to cut from such shapes, in the form of beads, strips or rods, elements of various lengths in which the length of the reinforcement fibers corresponds to the length of the said elements. These cut elements, once melted, are advantageously converted by extrusion, injection/compression or compression to preserve the final length of the fibers. The advantage consists of a substantial increase in the properties of rigidity, impact resistance, dimensional stability and retention of these properties at high temperatures.

The invention will be further described in connection with the following examples which are set forth for purposes of illustration only.

EXAMPLE 1

Glass fiber rovings are unwound from the outside and then impregnated with polyamide 6 powder (Orgasol 1002 D) by passing through a fluidized bed.

The polymer is melted in a flat die, and the final 10×4 mm profile is then shaped in a hot preshaping die kept at a temperature of 280° C., then in a cooling die kept at 22° C.

For this manufacture, the flat die being used for melting has the following geometry:

| | | |
|---|---|---|
| (i) length: | | 300 mm |
| (ii) width: | | 100 mm |
| (iii) intersection angle: | | 15° |
| (iv) length of introduction zone: | | 35 mm |
| (v) gap: | | 1 mm |
| (vi) width of die exit: | | 0.45 mm. |

The preshaping and cooling dies have an intersection angle of 20° over an inlet length of 5 mm.

Twenty-four 2400-tex rovings, reference Vetrotex R 099 5122 X 1, are used to produce this shape. The fluidized-bed powder impregnation level is kept at a constant 46% by volume.

The volume of one glass fiber roving before impregnation is approximately 0.45×4.5 mm. After impregnation, the roving is in the form of a bundle approximately 8–10 mm in diameter. The emerging drawing rate is one m/minute.

The rigidity of the profiles manufactured in this manner is measured by a three-point deflection method according to ASTM standard D 790. The modulus of elasticity E and the maximum stress $\sigma$ are measured.

For comparison purposes, an identical profile is prepared by direct shaping, passing the bundles of rovings impregnated with polyamide 6 through a hot air tunnel so that when they emerge, the resin is molten at the core of the bundles.

The mass of fibers coated with molten polyamide 6 is introduced into the shaping die kept at a temperature of 280° C.

As it emerges, the profile is drawn into the cooling die kept at 22° C.

The results obtained are as follows:

| | % of glass by volume, in the section | Deflection modulus E (GPa) | Maximum stress $\sigma$ (MPa) |
|---|---|---|---|
| Comparison test | 54 | 34 | 665 |
| Test according to the invention | 54 | 37 | 1007 |

EXAMPLE 2

Using the apparatus and process conditions of Example 1, a 10×4 mm section profile made of polyvinyl chloride reinforced with continuous long glass fibers is produced.

The conditions specific to the example are:

| | |
|---|---|
| (i) polyvinyl chloride powder with average diameter: | 100 μm |
| (ii) quantity of polyvinyl chloride impregnated: | 63.1% by volume |
| (iii) temperature of flat die: | 200° C. |
| (iv) temperature of shaping die: | 190° C. |
| (v) temperature of cooling die: | 15° C. |

The flat melting die has the following geometry:

| | |
|---|---|
| (i) length: | 200 mm |
| (ii) width: | 100 mm |
| (iii) intersection angle: | 1° |
| (iv) length of inlet zone: | 50 mm |
| (v) gap: | 1 mm |
| (vi) thickness at die exit: | 0.45 mm |

Under the apparatus conditions used in Example 1 for the comparison test, it was impossible to manufacture a proper long-fiber profile. Gelling of the rovings bundles was insufficient at the core.

An increase in the temperature of the hot air tunnel led to thermal degradation of the periphery of the impregnated roving bundle.

Under these conditions, the porosity of the final profile is too high, and the mechanical properties are mediocre and inconsistent.

The following results were obtained for a section according to the invention for a percentage of volume of glass fibers = 36.9:

| | |
|---|---|
| Deflection modulus E (GPa): | 25.2 |
| Maximum stress σ (MPa): | 476 |

EXAMPLE 3

Using the apparatus and process conditions of Example 1, a 10×4 mm section profile is produced from a polyamide 11 prepolymer powder with a molecular weight of 4000.

The grain size of the powder is between 80 and 200 μm. Eighteen 2400-tex R 099 P 103 rovings (Vetrotex) were used.

The drawing rate is 0.5 m/minute.

The viscosity of the prepolymer is raised in situ by heating in the flat die with water eliminated before the shaping die.

The conditions specific to the example are:

| | |
|---|---|
| (i) quantity of polyamide 11 impregnated: | 57.4% by volume |
| (ii) temperature of the flat die: | 270° C. |
| (iii) temperature of the shaping die: | 240° C. |
| (iv) temperature of the cooling die: | 22° C. |

The geometry of the flat die is as follows:

| | |
|---|---|
| (i) length: | 300 mm |
| (ii) width: | 100 mm |
| (iii) intersection angle: | 15° |
| (iv) length of inlet zone: | 35 mm |
| (v) gap: | 1 mm |
| (vi) thickness at die exit: | 0.45 mm |

The following results were obtained for the section for a percentage by volume of glass fibers = 42.6:

| | |
|---|---|
| Deflection modulus E (GPa): | 26.0 |
| Maximum stress σ (MPa): | 450 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In the process for manufacturing thermoplastic polymer articles reinforced with long continuous fibers by pultrusion, comprising impregnating tufts of fibers with thermoplastic resin, circulating an assemblage of said impregnated tufts in a heated assembly so as to melt the resin, and then hot shaping the article in an appropriate die to give it essentially its final shape before passing it through a second cooling die, the improvement comprising compressing and reducing the volume of the assemblage of impregnated tufts in the heated assembly consisting essentially of a flat die having an inlet zone and an exit zone, the inlet being wide enough to allow the initial volume of the impregnated tufts to pass through and a horizontal gap adapted to be varied in thickness, and allowing the emerging assembly of impregnated tufts to be brought to the shape of a sheet of minimum thickness before shaping; said die being of a length and heated to a temperature sufficient to melt said thermoplastic resin and keep it molten at the core of said sheet as it emerges from said die.

2. The process of claim 1, wherein the gap in the flat die of essentially rectangular cross section has essentially the geometry of a rectangular parallelepiped at the exit zone.

3. The process of claim 2, wherein the intersection angle corresponding to the slope of an introduction zone between the outside of the inlet zone and the horizontal part of the flat die gap is between 1° and 20°.

4. The process according to any one of claims 1 through 3, wherein the fibers are selected from the group consisting of glass, carbon and aramid.

* * * * *